United States Patent
Mohanta et al.

(10) Patent No.: US 10,336,907 B2
(45) Date of Patent: Jul. 2, 2019

(54) CRUMB RUBBER MODIFIED BITUMEN AND PROCESS OF PRODUCTION THEREOF

(71) Applicant: Indian Oil Corporation Limited, Bandra (East), Mumbai (IN)

(72) Inventors: Chandra Sekhar Mohanta, Faridabad (IN); Rabindra Kumar Padhan, Faridabad (IN); Veena Yadav, Faridabad (IN); Naduhatty Selai Raman, Faridabad (IN); Anurag Ateet Gupta, Faridabad (IN)

(73) Assignee: Indian Oil Corporation Limited, Mumbai (IN)

( * ) Notice: Subject to any disclaimer, the term of this patent is extended or adjusted under 35 U.S.C. 154(b) by 19 days.

(21) Appl. No.: 15/210,327

(22) Filed: Jul. 14, 2016

(65) Prior Publication Data
US 2018/0016437 A1    Jan. 18, 2018

(51) Int. Cl.
*C08L 95/00*    (2006.01)

(52) U.S. Cl.
CPC ............................. *C08L 95/00* (2013.01)

(58) Field of Classification Search
CPC .................................................... C08L 95/00
USPC ............................................................. 524/68
See application file for complete search history.

(56) References Cited

U.S. PATENT DOCUMENTS

| | | |
|---|---|---|
| 5,704,971 A | 1/1998 | Memon |
| 5,762,700 A | 6/1998 | Memon et al. |
| 6,478,951 B1 | 11/2002 | Labib et al. |
| 2006/0243163 A1* | 11/2006 | Martin .................. C08L 95/00 106/273.1 |
| 2007/0112102 A1* | 5/2007 | Kluttz .................. C08L 95/00 524/59 |
| 2015/0274974 A1* | 10/2015 | Bhatnagar ............. C08L 75/02 524/705 |

FOREIGN PATENT DOCUMENTS

| | | |
|---|---|---|
| EP | 2055745 | 5/2009 |
| WO | WO 2010023173 | 3/2010 |

OTHER PUBLICATIONS

Recycling of polyethylene terephthalate (PET) plastic bottle wastes in bituminous asphaltic concrete. pp. 1-28, Civil &Environmental Engineering Research Article, Sojobi et al.*

\* cited by examiner

*Primary Examiner* — Deve E Valdez
(74) *Attorney, Agent, or Firm* — Workman Nydegger

(57) ABSTRACT

The invention discloses anchoring of crumb rubber in asphalt using waste plastic particularly polyethylene terephthalate (PET) derived terepthalamide along with bi-functional reactive compounds. The invention also discloses a process for the production of storage stable crumb rubber modified bitumen by incorporating various components such as waste PET, waste crumb rubber powder and bi-functional reactive compounds in bitumen.

5 Claims, No Drawings

CRUMB RUBBER MODIFIED BITUMEN AND PROCESS OF PRODUCTION THEREOF

FIELD OF THE INVENTION

This invention is directed to anchoring of crumb rubber in asphalt or bitumen for use in or as other beneficial and desirable products. More particularly invention relates to asphalt, or bitumen, paving compositions that are modified by the addition of crumb rubber, PET derivatives and bi-functional compounds.

BACKGROUND OF THE INVENTION

Bitumen is a viscous liquid or a solid consisting essentially of hydrocarbons and their derivatives. It is soluble in trichloroethylene and softens gradually when heated. Bitumen is combined with aggregate and filler to form asphalt, which is used to pave roads or other surfaces.

Almost 30 million tons of crumb rubbers are annually generated in almost all parts of the world. Polymers are generally classified as thermoplastics and thermosets. Thermoplastic polymers can generally be melted and recycled using heating and remoulding processes. Thermoset polymers are cross-linked and, once they are set, the simple approach of melting and reforming into a new shape does not apply to them. Recycling of thermoset polymers is thus a challenging technical problem. Vulcanized rubber materials are thermoset polymers, and crumb rubber represents the largest stream of waste rubber materials and for the most part, these are inefficiently used or disposed of in landfills.

In parallel, the disposal of plastic water bottles, which are generated in very large quantities, is presently a large social and economic issue because of its bulkiness and the environmental degradation caused by the extremely long decomposition period of plastic.

PET products are excellent candidates for thermal recycling; its by-products are versatile and highly marketable. Plastic manufacturers do not wish to invest substantial resources in new capital equipment to produce new PET polymer material. Existing recycling facilities have insufficient capacity to process the huge amounts of waste generated. The resulting demand for recycled PET material is three times over the existing supply. High availability of lower priced recycled PET is a significant economic consideration in the overall pricing of the finished product. It is neither environmentally biodegradable nor compostable, and thus suffers from disposal problems. Recycling has become a viable alternative to the long-term accumulation of garbage, and there is substantial availability of recyclable PET waste. For example, post-consumer PET derived from soft drink bottles is available in bulk for relatively low cost. Bottle-grade PET is known to be of high quality among the various PET grades, and is available particularly as washed flakes. There are major incentives from environmental perspectives and governmental regulatory directives to find new and improved uses for PET waste.

More attention has been focused on reusing crumb rubbers in the past few years, but the current applications are generally limited to "low value" applications. Understanding the present markets for scrap tyres is a key to continuation and expansion of the recycling efforts toward higher value added uses of these materials.

Crumb rubber, particles of rubber typically obtained from used vehicle tyres, can be incorporated into bitumen. This is a sustainable means of disposing of the crumb rubber and also improves the properties of the bitumen. The crumb rubber is mechanically dispersed in the bitumen. However, during storage the crumb rubber can settle in the bitumen matrix, leading to an inhomogeneous dispersion. Such dispersions can be difficult to transport as it is difficult to pump such dispersions between storage vessels and delivery vehicles. Therefore it is desirable to improve the storage stability of the crumb rubber modified bitumen.

Several composition have been developed in prior art to enhance storage stability of crumb rubber modified bitumen.

U.S. Pat. No. 5,704,971A discloses an improved asphalt composition for pavement and a method for producing the same is characterized by mixing peroxide with crumb rubber to modify the crumb rubber so that it mixes more evenly with the asphalt when added thereto. A compatibilizer/polymer is also added to the asphalt. The resulting composition is homogeneous and demonstrates improved settling and rheological properties at high and low temperatures.

PCT application WO 2010023173A1 discloses a bitumen composition comprising crumb rubber, a polymer comprising glycidyl functional groups and wax. The bitumen composition can be used to prepare asphalt mixtures.

U.S. Pat. No. 6,478,951B1 discloses compatibilizer and process for use in making crumb rubber modified asphalt. The compatibilizer causes the crumb rubber to completely interact with the asphalt, thereby improving the rheological properties of the asphalt and reducing the tendency of pavement made with the asphalt to ravel. The compatibilizer has as its reactive component one or more glycidyl groups; its polymeric backbone can be ethylenic, styrenic, or acrylic or ethylene vinyl acetate (EVA).

U.S. Pat. No. 5,762,700 patent discloses the catalytic process for producing free radicals on crumb rubber by treating the crumb rubber with hydrogen peroxide in the presence of a catalyst such as Fenton's reagent, dioxomolybdenum bis(acetylacetonate), cobalt salt, tall oil, p-toluene sulfonic acid (PTSA), and others.

EP2055745 discloses a composition which comprises bitumen, crumb rubber, a polymer which can be vulcanized and a vulcanizing agent. Additionally, this composition may also comprise an accelerating agent of said vulcanization.

SUMMARY OF THE INVENTION

The present invention relates to a crumb rubber modified bitumen composition comprising:
(a) asphalt or bitumen;
(b) crumb rubber;
(c) PET derivatives; and
(d) bi-functional reactive compounds.

In one embodiment of the present invention, the asphalt used in the crumb rubber modified bitumen composition is natural asphalt or obtained from petroleum residue, or may be a mixture thereof. The asphalt has a penetration range from 30 to 250 dmm. Asphalt is present in the composition in the range between 30 to 90% by weight of the composition. Crumb rubber used in the present invention is obtained from grinding of used truck tyres or automobile tyres, or from any other source of rubber, such as natural rubber. Crumb rubber is present in the composition in the range of between 1 to 50% by weight of the composition. Preferably, crumb rubber is present in the specification between 1 to 30% by weight of the composition. PET derivatives include waste PET derivatives comprising terephthalamide chemical compounds obtained by aminolysis of waste PET. PET derivatives are present in the composition in the range between 0.01 to 20% by weight of the composition. Preferably, PET derivatives are present in the composition between 1 to 10% by weight of the composition. The bi-functional reactive compounds are selected from aliphatic, cycloaliphatic or aromatic bi-functional compounds, or mixtures thereof.

In a preferred embodiment of the present invention, the aliphatic bi-functional compounds in the composition have the general formula

X—(CH$_2$)$_n$—Y wherein X and Y are —OH, —COOH, —NH$_2$, —CONH$_2$, —CHO, —OR, epoxides, acrylate or X and Y may be same or different;

wherein R is an alkyl group; and wherein n=1 to 10.

In a preferred embodiment, the aliphatic bi-functional compounds are preferably selected from ethylenediamine, ethylene glycol, ethanolamine, adipic acid, pimelic acid, suberic acid, azelaic acid, amino acids, sebacic acid and dodecanedioic acid. In a further preferred embodiment, the cycloaliphatic bi-functional compounds are preferably selected from isophorone disocyanate (IPDI), cyclopentylene-1,3-diisocyanate and cyclohexylene-1,2-diisocyanate. In yet another preferred embodiment, the aromatic bi-functional compounds are preferably selected from benzidine, phthalic acid, p-phenylenediamine, 4,4-diphenyl disocyanate (MDI) and its isomers such as 2,4- and 2,2-diphenylmethane disocyanate, toluene disocyanate (TDI) and isomers thereof selected from 2,4- and 2,6-toluene disocyanate.

In a preferred embodiment, the bi-functional reactive compounds are present in the composition in the range from 0.01 to 20% by weight of the total composition. Preferably, the bi-functional compound is present in the composition between 0.1 and 10% weight of the total composition.

The present invention also relates to a process of preparing a crumb rubber modified bitumen composition comprising the steps of:

(a) heating neat asphalt to a predetermined temperature range of from about 150° C. to 170° C.;

(b) adding crumb rubber to heated neat asphalt and mixing while stirring the mixture with an agitator for 1 to 2 hours;

(c) adding PET derivatives derived from waste PET bottles in the mixture of step (b) and mixing while stirring the mixture with an agitator for 1 to 2 hours;

(d) adding bi-functional compound to the mixture of step (c) and mixing while stirring the mixture with an agitator for 1 to 2 hours within a temperature range of about 160° C. to about 170° C. to obtain the crumb rubber modified bitumen composition.

In a preferred embodiment, crumb rubber, PET derivatives and bi-functional compounds can be added to the heated neat asphalt of step (a) of the above process in a sequential order, or added simultaneously, while stirring.

In a preferred embodiment, in the process of the present invention (a) crumb rubber is present in the process in the range of between 1 to 50% by weight of the composition, or between 1 to 30% by weight of the composition;

(b) PET derivative is present in the process in the range between 0.01 to 20% by weight of the composition, or between 1 to 10% by weight of the composition.

(c) bi-functional reactive compounds are present in the composition in the range from 0.01 to 20% by weight of the composition or between 0.1 and 10% weight of the composition.

Yet another embodiment of the present invention relates to a crumb rubber modified bitumen composition for use in paving roads.

It is usually necessary for the modified bitumen to be held in a tank that is capable of being agitated in some way, as the polymers being of a different density to the bitumen tend to separate if kept in storage for prolonged periods. The possible problems with modified bitumen are mainly in the storage of the bitumen, mixing temperatures, and the length of time the material is held at elevated temperatures before laying.

There are now a number of well documented technologies relating to crumb rubber inclusion in hot bituminous mixtures, and a quick search on the internet will find them, however at this time it seems they are relatively expensive however "green" that they may be.

It is likely that the cost will come down as the technology develops, the production costs of the rubber crumb come down, and the problem of adding rubber crumb into the mixing process in a very hot environment are overcome.

Considerable research work, worldwide, is being performed on the inclusion of "crumb rubber" from old tyres to find an environmental answer to disposing of used tyres, whilst improving the properties of the bituminous mixtures that contain this rubber.

There is a need for a method of modifying reclaimed rubber particles from crumb rubbers to make them more useable in higher value applications and products. There is a need for a modified rubber particle that has storage and anchoring properties.

OBJECTIVE OF THE INVENTION

It is the primary objective of the invention that the novel composition which comprises bitumen, crumb rubber, PET derivatives and bi-functional reactive compound has high storage stability of crumb rubber modified bitumen.

It is the further objective of the invention to use the novel approaches for anchoring of crumb rubber by using waste plastic particularly polyethylene terephthalate (PET) derived terephthalamide along with bi-functional reactive compounds.

A general object of the invention is to modify bitumen using crumb rubber particles along with polyethylene terephthalate (PET) derived terephthalamide along with bi-functional reactive compounds to allow for broader and more valuable uses.

These and other objects and features of this invention will be better understood from the following detailed description taken in conjunction with the tables.

DETAILED DESCRIPTION OF THE INVENTION

While the invention is susceptible to various modifications and alternative forms, specific embodiment thereof will be described in detail below. It should be understood, however that it is not intended to limit the invention to the particular forms disclosed, but on the contrary, the invention is to cover all modifications, equivalents, and alternatives falling within the scope of the invention as defined by the appended claims.

The following description is of exemplary embodiments only and is not intended to limit the scope, applicability or configuration of the invention in any way. Rather, the following description provides a convenient illustration for implementing exemplary embodiments of the invention.

Various changes to the described embodiments may be made in the function and arrangement of the elements described without departing from the scope of the invention.

The terms "comprises", "comprising", or any other variations thereof, are intended to cover a non-exclusive inclusion, such that one or more processes or composition/s or systems or methods proceeded by "comprises . . . a" does not, without more constraints, preclude the existence of other processes, sub-processes, composition, sub-compositions, minor or major compositions or other elements or other structures or additional processes or compositions or additional elements or additional features or additional characteristics or additional attributes.

Definitions

For the purposes of this invention, the following terms will have the meaning as specified therein:

Anti-stripping: Separation of bitumen from aggregates in the presence of water is called stripping of bitumen. Prevention of stripping is called anti-stripping. Generally anti-stripping agents are added in bitumen to prevent stripping.

Penetration: Consistency of bituminous material expressed as the distance in tenths of mm that standard needle vertically penetrates a sample of the material under known condition of loading, time, temperature (i.e. 100 gm, 5 sec., 25° C.).

Softening Point: Softening point is the temperature at which the substance attains a particular degree of softening under specified condition of the test.

Anchoring: Bonding of crumb rubber particles with bitumen is called anchoring of crumb rubber modified bitumen.

Penetration range: The range in which the penetration values of bitumen falls.

The authors of the present invention have discovered that by adding bi-functional reactive and PET derivatives to asphaltic bitumen modified with crumb rubber, bitumen/crumb rubber systems completely stable to storage are achieved.

Using this system, the composition of the invention is maintained stable during prolonged time periods in the storage tanks, without the need for stirring.

Therefore, the first aspect of the present invention relates to a crumb rubber modified bitumen composition which comprises bitumen, crumb rubber, PET derivatives and bi-functional reactive compound.

In another aspect, the crumb rubber modified bitumen composition comprises bitumen, crumb rubber, waste PET derivatives and bi-functional reactive compounds.

The terms bitumen or asphalt in the present invention may be natural asphalt or obtained from petroleum residue and bearing a penetration range from 30 to 250 dmm (deci-millimeter) or may be mixture of natural and petroleum asphalt. Asphalt is present in the composition in the range between 30 to 90% by weight of the composition.

The term crumb rubber as used herein includes crumb rubber obtained from grinding of used truck tires or automobile tires, or from any other appropriate source of ground rubber, such as natural rubber.

In a preferred embodiment, the crumb rubber has the percentage in which it enters the mixture is between 1% and 50% by weight of the final composition. Preferably, the crumb rubber is present in the composition in a range between 1% and 30% by weight of the final composition.

PET is abbreviated form of polyethylene terephthalate, is a thermoplastic polymer resin of the polyester family and is used in synthetic fibers; beverage, food, water bottles, liquid containers, other plastic packaging items, thermoforming applications.

Waste PET derivatives in the present invention comprise terephthalamide chemical compounds obtained by aminolysis of waste PET. Aminolysis of waste PET involves the reaction of one or more amines and polyamines along with waste PET flacks in a suitable solvent and it is according to our co-pending application, Indian Patent Application No. 1049/MUM/2014 (corresponding U.S. application Ser. No. 14/659,089, published as US 2015/0274974 A1).

The percentage wherein the PET enters to form part of the crumb-rubber mixture is between 0.01% and 20% by weight of the total composition. Preferably, PET derivatives are present in the composition in a range between 1% and 10% by weight of the total composition.

In the present invention, we have developed storage stable crumb rubber modified bitumen composition by using waste PET derivatives along with bi-functional reactive compounds. The combination of bi-functional reactive compounds along with waste PET derivatives promote the anchoring of crumb rubber in bitumen and produces highly storage stable crumb rubber modified bitumen composition.

The bi-functional reactive compounds are generally chosen from aliphatic, cycloaliphatic and aromatic well known in the art, and mixture of these compounds.

Exemplary aliphatic reactive bi-functional compounds include compounds having general formula as given below.

$$X-(CH_2)_n-Y$$

wherein X and Y=—OH, —COOH, —NH$_2$, —CONH$_2$, —COOR, —CHO, —OR, epoxides, acrylate
etc. or X and Y may be same or different;
0wherein R may be any alkyl group; and
wherein n=1-10.

Aliphatic may be any alkane or alkene chain.

Illustrative examples of aliphatic bi-functional compounds can be ethylenediamine, ethylene glycol, ethanolamine, adipic acid, pimelic acid, suberic acid, azelaic acid, amino acids, sebacic acid, dodecanedioic acid etc.

The bi-functional compounds can also be cycloaliphatic and aromatic bi-functional compounds as well. Illustrative examples of cycloaliphatic bi-functional compounds isophorone disocyanate (IPDI), cyclopentylene-1,3-diisocyanate, cyclohexylene-1,2-diisocyanate etc.

Illustrative examples of aromatic bi-functional compounds are benzidine, phathalic acid, p-phenylenediamine, 4,4-diphenyl disocyanate (MDI) and its isomers such as 2,4- and 2,2-diphenylmethane disocyanate, toluene disocyanate (TDI) and isomers thereof, particularly the 2,4- and 2,6-toluene disocyanate etc.

The examples of aliphatic bi-functional compounds, cycloaliphatic bi-functional compounds and aromatic bi-functional compounds herein are illustrative in nature, and should not be considered as restricting the invention.

The percentage wherein these bi-functional reactive compounds enter the mixture are between 0.01% and 20%. Preferably, bi-functional reactive compounds are present in the composition in a range between 0.1% and 10% by weight of the total composition.

The present invention also discloses the process for the incorporation of PET derivatives and bi-functional reactive compound along with crumb rubber in bitumen which leads to anchoring of crumb rubber in bitumen to get highly storage stable crumb rubber modified bitumen composition.

Several blends with various compositions of crumb rubber, PET derivatives along with bi-functional reactive compound have been prepared to get storage stable crumb rubber modified bitumen.

The process comprises incorporation of various components in bitumen to get highly storage stable crumb rubber modified bitumen comprises following steps.

Adding to heated neat asphalt 30-90% said PET derivatives 0.01-20%, bi-functional reactive compounds 0.01-20% crumb rubber 1-30%, and mixed it properly with the help of agitator for few minutes to few hrs.

Crumb rubber may be added initially in heated bitumen or may be added after adding PET derivatives and bi-functional reactive compounds.

Bi-functional reactive compounds may be added before adding crumb rubber or after adding crumb rubber in heated asphalt.

Bi-functional reactive compounds or crumb rubber may be added simultaneously in heated neat asphalt.

The temperature range should be 160-170° C. throughout the process.

Neat bitumen can be easily heated at 150-170° C. However, maintaining the temperature range between about 160° C. to 170° C. is of critical importance in the aforesaid process as the temperature of the mixture gradually decreases on addition of neat bitumen. Proper reaction cannot be carried out at 150° C.

The developed storage stable crumb rubber modified bitumen composition of the present invention was evaluated for several physical and rheological properties by using various test methods and it has been found that the developed crumb rubber modified bitumen has high storage stability with improved performance properties.

In one aspect, the present invention is directed to the anchoring of crumb rubber with the help of PET derivatives along with bi-functional reactive compounds to produce crumb rubber modified bitumen with high storage stability.

In one more aspect, the present invention has solved a major problem of transportation of crumb rubber modified bitumen.

In another aspect, the present invention is directed to enhance the composition of waste crumb rubber in asphalt to get cost effective storage stable crumb rubber modified bitumen.

In yet another aspect, the present invention is directed to the production of storage stable crumb rubber modified from waste tyre rubber and waste plastics which further provides an alternate way for the disposal of waste keeping the environment free of pollution and hazardous materials.

Having described the basic aspects of the present invention, the following non-limiting examples illustrate specific embodiment thereof.

EXAMPLE-1

Asphalt in the present invention may be natural asphalt or obtained from petroleum residue and bearing a penetration range from 30 to 250 dmm or may be mixture of natural and petroleum asphalt.

Crumb rubber may be obtained from grinding of used truck tyres or automobile tyres, or from any other appropriate source of ground rubber.

Neat asphalt was heated to a temperature range between 150° C. to 170° C. Then crumb rubber was added and stirred for one hr. After that PET derivatives derived from waste PET were added in bitumen followed by stirring for 1 hr. Then ethylene diamine was added in bitumen and mixed properly for 1-2 hrs within a temperature range between 160° C. to about 170° C.

TABLE 1

| S.N. | Asphalt | Crumb Rubber (%) | PET derivatives (%) | Bi-functional reactive compound (Ethylene-diamine) (%) | (Diff. in upper and lower soft. pt) (° C.), (W.S) (Storage Stability) |
|---|---|---|---|---|---|
| 1. | Pen-80-100 | 10 | 2 | 1 | 2.5 |

W.S: Without Sieving

EXAMPLE-2

Asphalt in the present invention may be natural asphalt or obtained from petroleum residue and bearing a penetration range from 30 to 250 dmm or may be mixture of natural and petroleum asphalt.

Crumb rubber may be obtained from grinding of used truck tyres or automobile tyres, or from any other appropriate source of ground rubber.

Neat asphalt was heated to a temperature range between 150° C. to 170° C. Then crumb rubber was added and stirred for one hr. After that PET derivatives derived from waste PET were added in bitumen followed by stirring for 1 hr. Then ethanolamine was added in bitumen and mixed properly for 1-2 hrs within a temperature range between 160° C. to about 170° C.

TABLE 2

| S.N. | Asphalt | Crumb Rubber (%) | PET derivatives (%) | Bi-functional reactive compound (Ethanol-amine) (%) | (Diff. in upper and lower soft. pt) (° C.), (W.S) (Storage Stability) |
|---|---|---|---|---|---|
| 1. | Pen-80-100 | 10 | 2 | 1 | 3 |

W.S: Without Sieving

EXAMPLE-3

Asphalt in the present invention may be natural asphalt or obtained from petroleum residue and bearing a penetration range from 30 to 250 dmm or may be mixture of natural and petroleum asphalt.

Crumb rubber may be obtained from grinding of used truck tyres or automobile tyres, or from any other appropriate source of ground rubber.

Neat asphalt was heated to a temperature range between 150° C. to 170° C. Then crumb rubber was added and stirred for one hr. After that PET derivatives derived from waste PET bottles were added in bitumen followed by stirring for 1 hr. Then sebacic acid was added in bitumen and mixed properly for 1-2 hrs within a temperature range between 160° C. to about 170° C.

TABLE 3

| S.N. | Asphalt | Crumb Rubber (%) | PET derivatives (%) | Bi-functional reactive compound (sebacic acid) (%) | (Diff. in upper and lower soft. pt) (° C.), (W.S) (Storage Stability) |
|---|---|---|---|---|---|
| 1. | Pen-80-100 | 10 | 2 | 1 | 2 |

W.S: Without Sieving

EXAMPLE 4

Properties of Claimed Modified Bitumen after Sieving.

Asphalt in the present invention may be natural asphalt or obtained from petroleum residue and bearing a penetration range from 30 to 250 dmm or may be mixture of natural and petroleum asphalt.

Crumb rubber may be obtained from grinding of used truck tires or automobile tires, or from any other appropriate source of ground rubber.

Neat asphalt was heated to a temperature range between 150° C. to 170° C. Then crumb rubber was added and stirred for one hr. After that PET derivatives derived from waste PET bottles were added in bitumen followed by stirring for 1 hr. Then sebacic acid was added in bitumen and mixed properly for 1-2 hrs within a temperature range between 160° C. to about 170° C.

Crumb rubber modified bitumen produced in the present invention was sieved and followed by storage stability test using standard test method IS 15462:2004(ANNEX B).

TABLE 4

| S.N. | Asphalt | Crumb Rubber (%) | PET derivatives (%) | Bi-functional reactive compound (sebacic acid) (%) | (Diff. in upper and lower soft. pt) (° C.), (After Sieving) (Storage Stability) |
|---|---|---|---|---|---|
| 1. | Pen-80-100 | 10 | 2 | 1 | 1 |

EXAMPLE-5

Effect on storage stability due to the addition of crumb rubber along with bi-functional reactive compounds and PET derivatives in asphalt.

The bi-functional compound is generally chosen from aliphatic, cycloaliphatic and aromatic well known in the art, and mixture of these compounds.

Neat asphalt was heated to a temperature range between 150° C. to 170° C. Then bi-functional compound (sebacic acid), crumb rubber and PET derivatives derived from waste PET bottles were added in asphalt and mixed properly within a temperature range between 160° C. to about 170° C.(1-6 hr)

TABLE 5

| S.N. | Asphalt | PET derivatives (%) | Crumb Rubber (%) | Bi-functional reactive compounds (sebacic acid) % | (Diff. in upper and lower soft. pt) (° C.), (W.S) (Storage Stability) |
|---|---|---|---|---|---|
| 1. | Pen 80-100 | 1 | 10 | 0.5 | 1.9 |

From the above examples, Example 3 may be considered as the best working example in the present specification.

COMPARATIVE EXAMPLES: EXAMPLES 6 TO 9

The following examples 6 to 9 encapsulate the comparative examples, where the essential ingredients of the present invention are either missing or are outside the claimed range. Such examples show inferior properties in tabular format. Here property parameters of comparative examples are same with property parameters of the working examples.

EXAMPLE 6

Effect of storage stability when asphalt is not within range (Pen<30 dmm, and >250 dmm)

Neat asphalt (Pen:20 and Pen:280) was heated to a temperature range between 150° C. to 170° C. Then crumb rubber was added and stirred for one hr. After that PET derivatives derived from waste PET bottles were added in bitumen followed by stirring for 1 hr. Then bi-functional reactive compound (sebacic acid) was added in bitumen and mixed properly for 1-2 hrs within a temperature range between about 160° C. to about 170° C.

Crumb rubber modified bitumen produced in the present invention was sieved and followed by storage stability test using standard test method IS 15462:2004(ANNEX B).

TABLE 6

| S.N. | Asphalt | Crumb Rubber (%) | PET derivatives (%) | Bi-functional reactive compound (sebacic acid) (%) | (Diff. in upper and lower soft. pt) (° C.), (W.S) (Storage Stability) |
|---|---|---|---|---|---|
| 1. | Pen: 20 | 6 | 1 | 0.5 | >5 |
| 2. | Pen: 280 | 30 | 15 | 7 | >5 |

EXAMPLE-7

Effect on storage stability due to the addition of crumb rubber in asphalt.

Asphalt in the present invention may be natural asphalt or obtained from petroleum residue and bearing a penetration range from 30 to 250 dmm or may be mixture of natural and petroleum asphalt.

Crumb rubber may be obtained from grinding of used truck tyres or automobile tyres, or from any other appropriate source of ground rubber.

W.S: Without Sieving

Neat asphalt was heated to a temperature range between 150° C. to 170° C. Then 10% crumb rubber was added to it and then mixed homogenously with the help of agitator for 2-4 hours within a temperature range between 160° C. to about 170° C. The test data for separation difference in softening point without sieving as shown below in table.

TABLE 7

| S.N. | Asphalt | Crumb Rubber (%) | (Diff. in upper and lower soft. pt) (° C.), (W.S) (Storage Stability) |
|---|---|---|---|
| 1. | Pen-80-100 | 10 | 8 |

EXAMPLE-8

Effect on storage stability due to the addition of crumb rubber along with PET derivatives in asphalt.

PET is abbreviated form of polyethylene terephthalate, is a thermoplastic polymer resin of the polyester family and is used in synthetic fibers; beverage, food and other liquid containers, thermoforming applications and engineering resins.

Neat asphalt was heated to a temperature range between 150° C. to 170° C. Then crumb rubber and PET derivatives derived from waste PET bottles were added in asphalt and mixed properly within a temperature range between 160° C. to about 170° C.

TABLE 8

| S.N. | Asphalt | PET derivatives (%) | Crumb Rubber (%) | (Diff. in upper and lower soft. pt) (° C.), (W.S) (Storage Stability) |
|---|---|---|---|---|
| 1. | Pen-80-100 | 2 | 10 | 4 |

EXAMPLE-9

Effect on storage stability due to the addition of crumb rubber along with bi-functional compound in asphalt.

Neat asphalt was heated to a temperature range between 150° C. to 170° C. Then crumb rubber and PET derivatives derived from waste PET bottles and bi-functional compound (sebacic acid) were added in asphalt and mixed properly with in a temperature range between 160° C. to about 170° C.

TABLE 9

| S.N. | Asphalt | Bi-functional compound (sebacic acid) (%) | Crumb Rubber (%) | (Diff. in upper and lower soft. pt) (° C.), (W.S) (Storage Stability) |
|---|---|---|---|---|
| 1. | Pen-80-100 | 0.5 | 10 | 3.5 |

EXAMPLE-10

Data regarding anti-stripping properties

Example-1 shows best anti-stripping properties. Rest of the others also shows good anti-stripping properties.

TABLE 10

| S.N. | Asphalt | Crumb Rubber (%) | PET derivatives (%) | Bi-functional reactive compound (Sebacic acid) (%) | (Anti-stripping) (%) |
|---|---|---|---|---|---|
| 1. | Pen 80-100 | 10 | 2 | 1 | 98 |

Anti-stripping can be observed by standard test method (ASTM D 3625-96) given as follow.

Hot Water Immersion Tests: Boiling Water Test is a visual rating of the extent of stripping after the mixture is boiled. 238 grams of washed and dry aggregate and the 12 gm of melted bitumen is doped with the anti-stripping agent, mixed properly and are kept in oven at 85-100° C. Then a 2,000 ml beaker is filled halfway with distilled water and boiled. The mixture is placed in boiling water for 10 minutes. Asphalt cement that is floating is skimmed off from the top. The water is cooled to room temperature and then poured off. The aggregate mixture is emptied onto a white paper towel and graded, then visually observed for the remaining percentage of coated area (not stripped by water). After 24 hours the aggregate mixture is observed again.

EXAMPLE-11

Effect on physicochemical properties due to the addition of PET derivatives along with bi-functional compound in bitumen.

Anchoring-1: Asphalt+crumb rubber+bi-functional reactive compounds+PET Derivative.

TABLE 11

| S.N. | Property | CRMB-55 | Anchoring-1 |
|---|---|---|---|
| 1. | Penetration at 25° C., ¹/₁₀ mm, 5 sec. | 46 | 53 |
| 2. | Softening point, (R&B), ° C. | 57 | 57 |
| 3. | Elastic Recovery of half thread in ductilometer at 15° C., % | 65 | 69 |
| 4. | Viscosity at 150° C., Poise | 3.86 | 4.60 |

All physicochemical properties have been carried out by standard test method as given as follow.

Penetration Hardness; ASTM D5: Specimens are prepared in sample containers exactly as specified (ASTM D5-97) and placed in a water bath at the prescribed temperature of test for 1 to 1.5 hours before the test. For normal tests the precisely dimensioned needle, loaded to 100±0.05 g, is brought to the surface of the specimen at right angles, allowed to penetrate the bitumen for 5±0.1 s, while the temperature of the specimen is maintained at 25±0.1° C. The penetration is measured in tenths of a millimetre (deci-millimetre, d-mm).

Ring and Ball Softening Point (RBSP); ASTM D36: This test method covers the determination of the softening point of bitumen in the range from 30 to 157° C. [86 to 315° F.] using the ring-and-ball apparatus immersed in distilled water [30 to 80° C.] or USP glycerine (above 80 to 157° C.). The values stated in either SI units or inch-pound units are to be regarded separately as standard.

Elastic Recovery ASTM D6084-06: The elastic recovery is measured by the percentage to which the asphalt residue will recover its original length after it has been elongated to a specific distance at a specified rate of speed and then cut in half. The distance to which the specimen contracts during a specified time is measured and the elastic recovery is calculated.

Rotational Viscometer (RV); ASTM D4402/D4402M—This test method outlines a procedure for measuring the apparent viscosity of asphalt from 38 to 260° C. [100 to 500° F.] using a rotational viscometer and a temperature-controlled thermal chamber for maintaining the test temperature.

EXAMPLE-12

High performance and rheological properties of crumb rubber modified bitumen due to addition of PET derivatives along with bi-functional compounds in bitumen.

DSR: Dynamic Shear Rheometer
RTFO: Rotating Thin Film Oven
BBR: Bending Beam Rheometer (for bending beam creep stiffness test)
Anchoring-1: Asphalt+crumb rubber+Bi-functional compounds+PET Derivative.

Dynamic Shear, ASTM D7175, is determined both before and after simulated aging in the Rolling Thin Film Oven (RTFO) test to determine minimum binder stiffness as exhibited in freshly paved roads up to one year in age.

Bending Beam Creep Stiffness, ASTM D 6648, is determined after RTFO aging to determine the low thermal cracking of asphalt. The Bending Beam Creep Stiffness test measures low temperature stiffness characteristics. A 12.7 cm×0.6 cm×1.3 cm (5"×¼"×½") beam of binder material is moulded, cooled to testing temperature, and subjected to an imposed weight load. Load versus deflection data is collected for 240 seconds. The low temperature specification values are based on the stiffness value determined at 60 seconds and the absolute value of the slope (m-value) of the time vs. log (Stiffness) curve determined at 60 seconds.

Storage stable crumb rubber modified asphalt developed in the present invention, exhibits acceptable and better data for low temperature creep stiffness and "m" values than exhibited by neat asphalt, when tested at low temperatures ranging from −42° C. to 0° C. according to ASTM D6648 test method. A comparative study of Bending Beam Creep Stiffness test data for the various blends having different composition is given in Table 12 below.

Storage stable crumb rubber modified asphalt developed in the present invention, exhibiting improved Dynamic Shear Rheometer stiffness values for original binder as well as after RTFO of modified asphalt, which when tested with a dynamic shear rheometer at temperatures ranging from 58° C. to 82° C., exhibits G*/sin (δ) stiffness values which are greater than stiffness value for neat asphalt as shown in data given in table below.

Anchoring-1: Asphalt+crumb rubber+bi-functional reactive compounds+PET Derivatives.

TABLE 12

| S.N. | Property | Requirement as per ASTM D6373-07 | CRMB-55 | Anchoring-1 |
|---|---|---|---|---|
| 1. | DSR-Original Binder, G*/Sin δ-Value (Kpa) | 1.00 Min | 1.87 at 70° C. | 1.08 at 82° C. |
| 2. | DSR-(After-RTFO), G*/Sin δ-Value (Kpa) | 2.20 Min. | 2.76 at 70° C. | 2.25 at 82° C. |
| 3. | BBR (After-RTFO) m-Value/Estimated Stiffness (MPa) | m Value ≥ 0.300 Min/Estimated Stiffness < 300 | 0.24/300 at −18° C. | 0.30/186 at −18° C. |

The DSR and BBR values of the product of the invention meet as per required ASTM D6373-07. It means product has good performance properties. (Rutting, Fatigue and low temperature stiffness properties.)

EXAMPLE-13

Hybrid bitumen produced in the present invention meets with all modified bitumen specifications as per IS 15642: 2004/IRC: SP: 53-2010 and ASTM D6373-07.

Hybrid bitumen can also be produced in the present invention by using PET derivatives, bi-functional compounds and crumb rubber from bitumen with penetration range of 80-100 dmm. Hybrid bitumen produced in the present invention meets with all modified bitumen specifications as per IS 15642:2004/IRC: SP: 53-2010 and ASTM D6373-07.

TABLE 13

| S.N. | Property | Hybrid Bitumen | PMB-40 Specification As per Type-B, IS: 15462-2004 | CRMB-60 Specification As per IS: 15462-2004 for CRMB-60 | Modified bitumen Specification As per IRC SP 53-2010 for above 35° C. highest mean air temp. |
|---|---|---|---|---|---|
| 1. | Penetration at 25° C., ¹/₁₀ mm, 5 sec. | 47 | 30-50 | <50 | 30-50 |
| 2. | Softening point, (R&B), ° C. | 61 | 60 Min. | 60 Min. | 60 Min. |
| 3. | Elastic Recovery of half thread in ductilometer at 15° C., % | 72 | 70 Min. | 50 Min. | 60 Min. |
| 4. | Viscosity at 150° C., Poise | 6 | 3-9 | 3-9 | 5-9 |
| 5. | Separation Test (Difference in softening point, (R&B), ° C. | 2.5 (Without Sieving) | 3 Max. | 4 Max (With Sieving) | 3 Max (With Sieving) |

We claim:

1. A crumb rubber modified bitumen composition comprising:
   (a) Asphalt in the range of 50 to 90% by weight of the composition;
   (b) crumb rubber in the range of 5 to 30% by weight of the composition;
   (c) PET derivatives in the range of 0.1 to 10% by weight of the composition; and
   (d) bi-functional reactive compounds in the range of 0.1 to 10% by weight of the total composition;
   wherein, Asphalt is having penetration in the range of 30 to 150 dmm;
   wherein the bi-functional reactive compounds are selected from pimelic acid, suberic acid, azelaic acid, sebacic acid and dodecanedioic acid.

2. The composition of claim 1 wherein the asphalt is natural asphalt or obtained from petroleum residue, or may be a mixture thereof.

3. The composition of claim 1 wherein crumb rubber is obtained from grinding of used truck tyres or automobile tyres, or from any other source of rubber.

4. The composition of claim 1 wherein PET derivatives include waste PET derivatives comprising terephthalamide chemical compounds obtained by aminolysis of waste PET.

5. A crumb rubber modified bitumen composition as claimed in claim 1 for use in paving roads.

* * * * *

UNITED STATES PATENT AND TRADEMARK OFFICE
CERTIFICATE OF CORRECTION

PATENT NO.         : 10,336,907 B2
APPLICATION NO.    : 15/210327
DATED              : July 2, 2019
INVENTOR(S)        : Chandra Sekahar Mohanta et al.

Page 1 of 1

It is certified that error appears in the above-identified patent and that said Letters Patent is hereby corrected as shown below:

On the Title Page

Left-hand Column, under Item (65) please add the following:
(30) Foreign Application Priority Data
July 23, 2015 (IN).............................2800/MUM/2015

Signed and Sealed this
Eleventh Day of August, 2020

Andrei Iancu
*Director of the United States Patent and Trademark Office*